Feb. 19, 1929.
H. B. SMITH
1,702,421
ELECTRICAL MEASURING INSTRUMENT
Filed May 19, 1927
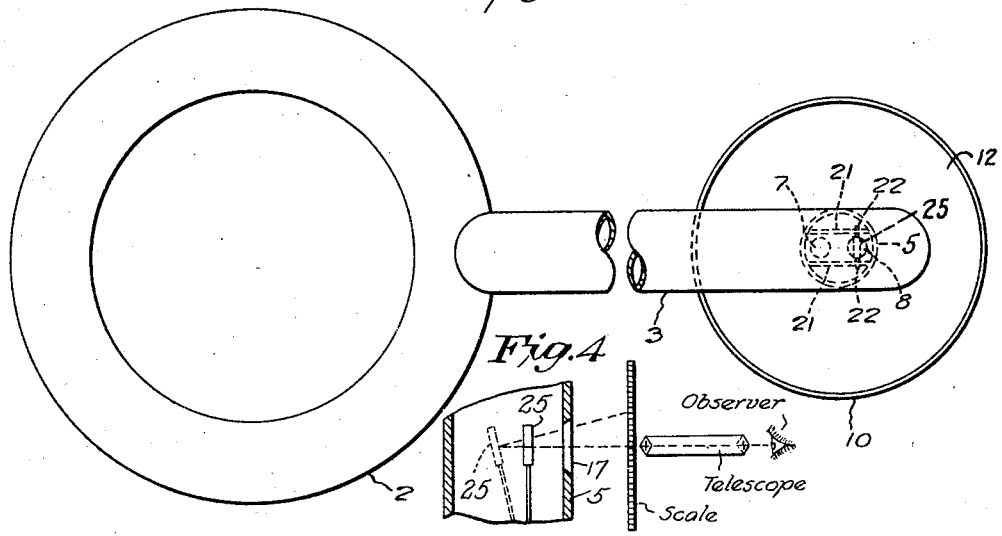
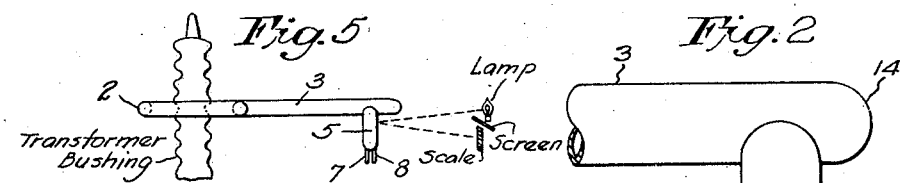
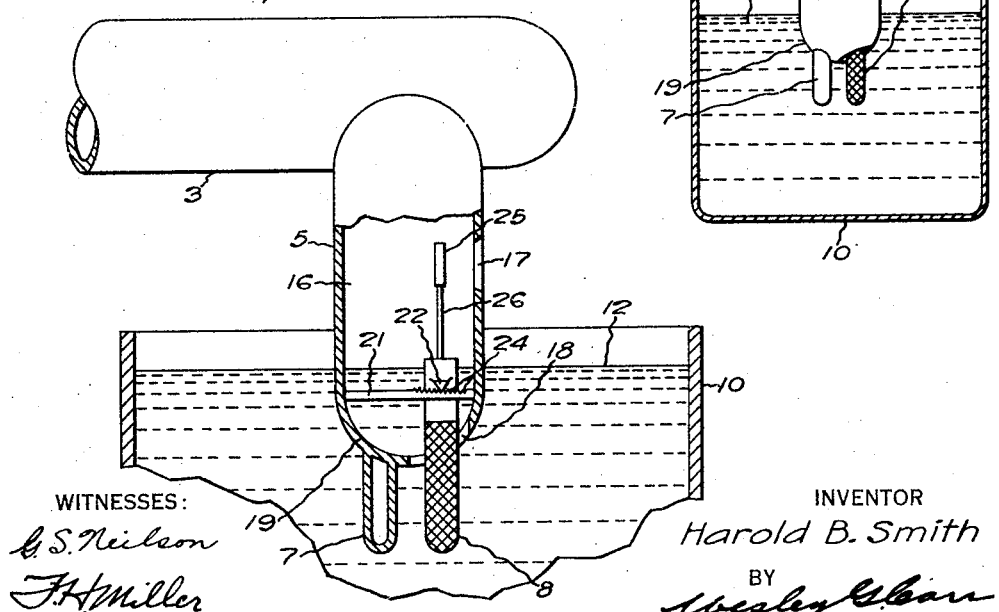
WITNESSES:
G. S. Neilson
F. H. Miller
INVENTOR
Harold B. Smith
BY
Wesley Glean
ATTORNEY Patented Feb. 19, 1929.

1,702,421

UNITED STATES PATENT OFFICE.

HAROLD B. SMITH, OF WORCESTER, MASSACHUSETTS, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed May 19, 1927. Serial No. 192,550.

My invention relates to electrical measuring instruments and particularly to instruments for measuring extremely high voltages.

One object of my invention is to provide an instrument of the above indicated character, that shall prevent the formation of corona and undesirable electrostatic forces thereon.

Another object of my invention is to provide a high-voltage instrument that shall be safe and convenient to operate.

Another object of my invention is to provide a high-voltage instrument that shall embody an effectively damped movable element capable of very accurate reading within the range or ranges of the instrument.

Another object of my invention is to provide a high-voltage device that shall embody correlated parts, for disposition in different insulating media, that shall be constructed in accordance with characteristics of said media, to preclude the formation of corona on the parts.

Another object of my invention is to provide a high-voltage measuring instrument in which the parts shall be so constructed and related as to completely shield the same from strong external electrostatic fields, thereby preventing changes in the calibration of the instrument, in which the deflecting force shall be proportional to the root-mean-square value of voltage, the restoring force shall be the constant force of gravity, there shall be no magnetic parts to be influenced by magnetic fields and in which there shall be perfect damping.

Another object of my invention is to provide an electrical measuring device that shall be so extremely accurate and permanent in its indications as to conform to all requirements of an instrument for standard and rapid measurement of very high voltages.

A further object of my invention is to provide a high-voltage instrument that shall be simple and durable in construction, economical to manufacture and effective in its operation.

Progress in the generation, measurement, transmission, and use of high-voltage has been deterred by difficulties in these different branches of the electrical art, and, as success is attained in certain of the branches for certain voltages, it may be delayed in its useful application by lack of corresponding success in the other branches.

In other words, voltages of as high values as may safely and expeditiously be handled are desirable and there is no recognized limit which they may not attain, particularly for research and experimental work, providing all of the elements in the sources, measuring instruments, transmission lines and translating devices properly co-operate.

For instance, it has already been demonstrated that it is possible to produce a million volts or more but, so far, no effective commercial means has been devised nor is there, at present, a demand for transmitting a voltage of such value over great distances.

As commercial voltages increase, and as they will continue to increase, it is found that certain conductors and other elements, which have been satisfactory for the previously used voltages, are not suited to the increased voltages and must be modified.

One of the deterring effects to the utilization of very high voltages has been the phenomenon of corona formation losses and other effects on elements of dimensions, shapes and other characteristics as they have been ordinarily considered and used. This phenomenon causes very great energy losses, interruption of service, damage to apparatus and other undesirable features, besides rendering the use of instruments and other elements, in, or on, which it occurs very undesirable, erratic, inefficient or impossible, depending upon its intensity and the conditions of its occurrence.

Various expedients for measuring high voltages have been suggested and employed, but, by reason of corona and other effects and forces encountered in high-voltage structures, certain of these expedients have been very ineffective and others relatively expensive and complicated. In fact, there is no instrument of such simple mechanical character as the device of my invention, of which I am aware, that is adapted for effectively and directly measuring corona-forming voltages.

It is my aim to overcome the above mentioned objections and to provide an instrument that is extremely simple in construction and effective in operation.

Accordingly, in practicing my invention, I provide an instrument that, while based fundamentally on the principle of the old and well-known gold-leaf electroscope and therefore, of extremely simple mechanical construction and operation, embodies parts which are so shielded from corona and from other parts, upon which the formation of corona is so prevented, as to permit its use for measuring the highest voltages that can be produced and in connection with which instruments and methods have heretofore been unavailable, ineffective, complicated, subject to errors which are difficult to determine and eliminate and are variable in character.

A movable element of the instrument is also so constructed, disposed and damped as to permit the accurate reading of actual values of voltages rather than merely giving an indication that a voltage exists, as with the above mentioned electroscope or similar electrostatically-operated devices. In other words, in contradistinction to a wavering leaf, or similar uncontrolled element, which may not assume the same shape or position for repeated applications of the same voltage, the movable element of my instrument is constructed, and operates, similar to the movable elements of low voltage precision instruments and with corresponding accuracy.

Figure 1 of the accompanying drawing is a top plan view of an instrument and correlated parts constructed in accordance with my invention, Fig. 2 is a side view, partially in elevation and partially in section, of a portion of the structure shown in Fig. 1, Fig. 3 is an enlarged detail view of a portion of the device, as illustrated in Fig. 2.

Fig. 4 is a view similar to Fig. 3 showing means for measuring the deflection of the movable mirror, and Fig. 5 is a view in side elevation of my device applied to a transformer terminal for operation in air.

The device comprises, in general, a member 2 for association with a suitable source of electromotive force, such as being inductively related, or directly connected, to a high-voltage transformer terminal (not shown), a conducting lead element 3 projecting therefrom, a branch lead portion 5 of the lead 3, relatively movable indicating elements 7 and 8 projecting from the branch portion 5, and a casing or container 10 for a body 12 of oil or other insulating fluid or medium in which the elements 7 and 8, and preferably a portion of the lead 5 adjacent to the position of joinder thereof to the elements 7 and 8, are immersed and which is different from the air or other insulation medium surrounding the parts 2 and 3.

The member 2, of toroidal or other suitable shape, is preferably connected to the transformer terminal, above referred to, but may be inductively related to the terminal. The member 2 has a conducting outer surface and each section of its perimeter or body surface is of such radius as to preclude the formation of corona thereon, in consideration of the voltage to be applied thereon and the particular medium in which it is disposed. The conducting surface is of such radius of curvature and so free of interruptions and projections, as to prevent the concentration of electrostatic stresses or potential gradients to the corona-forming stage. That is, all of the surfaces are of such radius or curvature that, at the voltages to be measured, they will not permit corona-forming potential gradients adjacent thereto.

The member 2 may be constructed solid or hollow and of insulating or conducting material, so long as it is provided with a conducting surface. It may be formed of insulating material having a conducting coating of metal foil or other conducting material but is preferably constructed of sheet metal, such as copper, iron or aluminum.

The lead 3, which takes the place of an ordinary wire voltmeter lead in low voltage structures, is constructed similarly to the member 2 to have a non-corona-forming outer surface, is preferably of uniform cylindrical shape and of the same radius as the radius of a section of the member 2. However it may be of other shape in cross sectional contour, such as oval, and of other dimensions so long as its surface merges gradually and with sufficient radius of curvature into the surface of the member 2.

The outer end 14 of the lead 3 is preferably rounded, as shown, or the body of the lead may curve into the portion 5, as in a bent rod or wire.

The lead 3 is suitably connected to the member 2 and to the portion 5, as by soldering.

Whether the member 2 and the lead 3 are constructed hollow or solid, the portion 5 is constructed hollow to provide a space or chamber 16 therein having apertures 17 and 18 through the walls thereof. It has a lower end 19 of rounded contour and a conducting outer surface, and is preferably constructed of sheet metal.

The element 7, which may also be constructed of insulating material having a conducting coating, or of sheet metal, to provide a conducting outer surface, is preferably fixed to the end 19 in any suitable manner, as by soldering. The diameter and surface area of the element 7 are determined by the character of the insulating medium 12 and, if this medium is an ordinary good grade of insulating oil, which it preferably should be, the diameter and area may be smaller than the diameter and area of the parts surrounded by air. The lower end of the element 7 is also preferably rounded.

The element 8 is preferably of hollow cylindrical metal construction having perforate lower walls and a rounded lower end and depends from bars 21, or other suitable means, in the portion 5, through the aperture 18.

A pair of fulcrum elements, knife-edge members or pivot trunnions 22, project oppositely from the upper part of the element 8 for pivotally mounting the element between the bars 21 which are provided with notches 24, or other suitable means, whereby the element 8, and its pivot axis, may be adjusted relative to the element 7.

The lower portion of the element 8 is of perforate or equivalent construction, as above mentioned, in order to damp its movement in the fluid 12. This construction may take the form of a slotted, or otherwise apertured, sheet-metal cylinder or be in the form of a cylindrical sheet of wire mesh screening, as shown. In either case, the perforations and metal outer surface are proportioned and related to obtain an effect substantially similar to an uninterrupted outer surface, so far as the formation of corona is concerned.

The upper portion of the element 8 may be, for convenience, constructed similarly to the lower portion but may also be constructed of imperforate sheet material, as shown.

A mirror 25, or other suitable indicating element responsive to relative movement of the elements 7 and 8, may be mounted, by means of a projection 26, on the element 8 opposite the aperture 17.

Where the element 25 is a mirror, it is then adapted for co-operation with a beam from a source of light and a scale (not shown) disposed a suitable distance from the structure, to the right as viewed in Figs. 2 and 3. The mirror may also serve to reflect readings from an illuminated scale to a telescope (not shown) for accuracy.

The casing 10 may be constructed of any suitable material, preferably such as refractory or hard molded insulating material, but is of such dimensions and relation to the other parts, as to prevent the formation of corona or to avoid otherwise interfering with the operation of the device.

In operation, when the elements 2, 3, 5, 7 and 8 are electrically connected together at high voltages electrostatic forces, between the elements 7 and 8, tend to repel these elements from each other and, since the element 8 is movable, it pivots about the axis of the trunnions 22 to move the mirror 25 opposite the opening 17. Since the lower portion of the element 8 is perforate, in the manner above described, movement of the element is so damped as to prevent undue fluctuation of the mirror 25. Thus, when a beam of light is cast, through the opening 17, onto the mirror 25 and is reflected, through the opening, onto a scale, or an illuminated scale is read by a telescope, an accurate indication of the voltage is given.

The reflected beam may also be directed against a selenium or photo-electric cell, in a well understood manner, or other means may be employed, to transmit effects in accordance with relative movement of the elements 7 and 8. The mirror may also be replaced by a pointer or other device for observation from a distance.

Also, instead of the elements 7 and 8, two or more elements, similar to the portion 5 without the elements 7 and 8, may be relatively movably mounted on the conductor 3 to operate in air, like the elements 7 and 8 operate in oil.

By my invention, a simple and effective means for obtaining accurate direct readings of extremely high voltages is obtained in a structure that is economical to manufacture and safe to operate, which is, in general, an improvement in the high-voltage measuring art.

While I have shown and described a particular form of my invention, changes may be effected therein without departing from the spirit and scope thereof, as set forth in the appended claims.

I claim as my invention:

1. A high-voltage instrument comprising a conducting lead having an apertured hollow portion and constructed to prevent the formation of corona thereon, and a plurality of similarly constructed relatively movable conducting elements, projecting from the lead, one of said elements being mounted inside said hollow portion and projecting through said aperture.

2. A high-voltage instrument comprising a conducting lead including a hollow portion having a plurality of apertures therein and constructed to prevent the formation of corona thereon, a plurality of similarly constructed relatively movable conducting elements projecting from the lead and actuated by electrostatic action, one of said elements being mounted inside said hollow portion and projecting through one of said apertures, and an indicating member in said hollow portion opposite another of said apertures and responsive to relative movement of said elements.

3. A high-voltage instrument comprising a conducting lead having an apertured hollow portion and constructed to prevent the formation of corona thereon, a plurality of similarly constructed relatively movable conducting elements projecting from the lead, and an indicating member disposed in said hollow portion opposite said aperture and responsive to relative movement of said elements.

4. In combination, a member having a conducting surface of gradually rounded contour and relatively great area with respect to the area of a conductor for normally carrying the quantity conducted for association with a high-voltage transformer terminal, a similarly constructed conducting lead member projecting from said first member, both of said members being thus adapted to prevent the formation of corona thereon in air, a casing for an insulating fluid other than air and a movable conducting indicating element therein, said element being connected to said lead and being similarly adapted to prevent the formation of corona on the indicating element in said other insulating fluid.

5. A high-voltage instrument comprising a casing for an insulating liquid, an instrument lead of gradually rounded contour and conducting surface area to prevent the formation of corona thereon in air and having a hollow portion immersed in said liquid, a pair of mutually-electrostatically-repulsive elements projecting from said hollow portion in said liquid and being of widely rounded contour and having sufficient radius of curvature of surface to prevent the formation of corona thereon in said liquid, one of said elements being pivotally mounted in said hollow portion and having an outer portion adapted for damping co-operation with said liquid, and a mirror mounted on the pivoted element inside said hollow portion opposite an opening therein above the liquid level.

6. A high-voltage instrument comprising a casing for an insulating liquid, an instrument lead having a conducting surface of suitable radius of curvature to prevent the formation of corona thereon in air and embodying a hollow sheet-metal portion partially immersed in said liquid, a pair of mutually-electrostatically-repulsive elements projecting from said hollow portion in said liquid and each having a conducting surface of radius of curvature sufficient to prevent the formation of corona thereon in said liquid, one of said elements being adjustably pivotally mounted in said hollow portion and having a portion outside said hollow portion constructed of perforate metal for damping co-operation with said liquid, and a mirror mounted on the pivoted element in said hollow portion opposite an opening therein above the liquid level.

7. A high voltage instrument comprising a conducting lead having an apertured hollow portion and constructed to prevent the formation of corona thereon, and a movable conducting element mounted in said hollow portion and projecting through said aperture.

In testimony whereof, I have hereunto subscribed my name this fifth day of May, 1927.

HAROLD B. SMITH.